United States Patent [19]

Brenner

[11] Patent Number: 5,163,843
[45] Date of Patent: Nov. 17, 1992

[54] SIMULATED DISEASED EYE LENS AND METHD OF MAKING THE SAME

[75] Inventor: Sari L. Brenner, Irvine, Calif.

[73] Assignee: Nestle, S.A., Switzerland

[21] Appl. No.: 592,299

[22] Filed: Oct. 2, 1990

[51] Int. Cl.⁵ .............................................. G09B 23/28
[52] U.S. Cl. .................................... 434/271; 434/267
[58] Field of Search ............... 434/262, 267, 270, 271, 434/295, 296, 297; 623/4, 5, 6

[56] References Cited

U.S. PATENT DOCUMENTS

| 3,454,332 | 7/1969 | Siegel. | |
|---|---|---|---|
| 4,346,482 | 8/1982 | Tennant et al.. | |
| 4,713,072 | 12/1987 | Bowald. | |
| 4,731,080 | 3/1988 | Galin. | |
| 4,744,647 | 5/1988 | Meshel et al.. | |
| 4,762,495 | 8/1988 | Maloney et al.. | |
| 4,762,496 | 8/1988 | Maloney et al.. | |
| 4,865,551 | 9/1989 | Maloney et al. | 434/271 |
| 4,865,552 | 9/1989 | Maloney et al. | 434/271 |

FOREIGN PATENT DOCUMENTS

| 1465900 | 3/1989 | U.S.S.R. | 434/271 |
|---|---|---|---|
| 1517060 | 10/1989 | U.S.S.R. | 434/262 |
| 1527656 | 12/1989 | U.S.S.R. | 434/271 |
| 2205675 | 12/1988 | United Kingdom | 434/267 |

OTHER PUBLICATIONS

Iatrotech Inc., *Opthamology Times*, vol. 15, No. 5, Mar. 1, 1990, p. 63.

*Primary Examiner*—Richard J. Apley
*Assistant Examiner*—Karen Richard
*Attorney, Agent, or Firm*—James Arno; Sally Yeager; Robert L. Price

[57] ABSTRACT

A simulated cataractous lens and method of making the same are disclosed. The simulated lens is comprised of a proteinaceous material, such as natural animal lens material which is selectively hardened and which has the hardness and transparency thereof altered by predetermined amounts so as to correspond to different stages of cataract afflicted lenses.

13 Claims, No Drawings

SIMULATED DISEASED EYE LENS AND METHD OF MAKING THE SAME

BACKGROUND OF THE INVENTION

The present invention relates generally to simulated eye lenses and, more particularly, to simulated diseased lenses and processes of making the same.

Microsurgical operations are highly successful, but they require the surgeon to exercise a great degree of control over the surgical handpiece and yet provide a minimum degree of bodily invasiveness. In ophthalmological microsurgery one known technique for removing cataracts is phacoemulsification. The phacoemulsification technique typically involves the use of a microsurgical handpiece that includes an ultrasonically operative tip that is typically inserted through an incision in the eye; which incision is in the order of about 3 mm. Extreme care must be taken during such surgery to avoid unnecessary damage to other parts of the eye. Phacoemulsification is a procedure that is very demanding of the surgeon in terms of both surgical skill and intraoperative vigilance. In this regard, a surgeon performing such an operation must receive instructions regarding the technique.

It is important that surgeons have the ability to learn and practice the phacoemulsification technique. The surgeon must be able to repeatedly practice the motor coordination skills required to manipulate and emulsify a lens. Towards this end there have been several approaches. One includes using animal eyes (e.g., geese, rabbits, cows and pigs). A shortcoming of this approach is that animal eyes have not developed cataracts. Accordingly, these untreated animal eye lenses are generally inadequate. Thus, the simulation desired for practicing and demonstrating the simulation desired for the emulsification techniques is not as good as is otherwise desired.

Other approaches designed for improving simulation are described in U.S. Pat. Nos. 4,762,495 and 4,762,496 to Maloney et al. Basically, these patents describe the formation of a simulated human ocular system employing an artificial lens phantom. The lens phantom is constructed so as to resemble human cataracts both in terms of hardness and lens translucency. The overall simulated ocular system includes the use of a number of man-made elements that are fitted together such as, for example, a unitary corneal cap and an encapsulated lens and iris. The encapsulated lens includes a wall made of a vinyl film, which is cataract phantom composed of a water-soluble composition designed to be similar to that found in the natural occurring cataract. To retain the same emulsification characteristics a permanent hydrogel material is provided using a cross-linked gelatin. The material is hydrated or provided with proper water sensitivity by the incorporation of a water soluble polymer. The hardness of the artificial cataract is controlled by the addition of fillers of micron-sized glass beads. It is appreciated that the foregoing approach is expensive and time consuming. Further, the degree of simulation is less than entirely satisfactory given the large number of artificial components.

The present invention is directed to improving upon heretofore known techniques for producing simulated diseased lenses, especially cataractous lenses, having degrees of hardness and loss of transparency so that they resemble the various degrees or stages of cataract affliction. Heretofore, none of the known approaches utilize natural animal eyes or other suitably hardened proteinaceous material with the desired hardness and loss of transparency which correspond to various stages of diseased cataract lenses.

SUMMARY OF THE INVENTION

The present invention overcomes the disadvantages of the prior art by providing vastly improved simulated diseased lenses, especially those which ideally correspond to various stages of cataractous afflicted human eyes and which are both simple and economical to manufacture.

In accordance with this invention, there is provided a method of hardening a proteinaceous material so as to simulate the hardness of a cataractous lens. The method comprises a step of selecting proteinaceous material which is shaped similar to a human eyes lens; the step of selectively opening preselected portions of the proteinaceous material; the step of applying, to at least the partially opened lens portions a treating solution which includes a preselected strength of protein hardening agent; and the step of subjecting the immersed lens to a predetermined temperature for a preselected time period for effecting a predetermined hardening of the lens.

In one illustrated embodiment the proteinaceous material is selected from animal eye lenses having physiological similarities to a human eye lens.

In another illustrated embodiment the hardening agent is an organic hardening compound. In still another embodiment the organic hardening agent is an aldehyde fixative; such as glutaraldehyde.

In still another embodiment the hardening agent reduces the translucency of the animal eye lens.

In another illustrated embodiment, the degree of lens hardness is proportional to the duration of immersion time in the treating solution.

Among the other objects and features of the present invention are the provision of an improved simulated cataractous lens; the provision of an improved simulated cataractous lens having various degrees of hardness which correspond to the different hardness stages of cataracts; the provision of an improved lens of the last noted type in which the transparency thereof is selectively diminished so as to simulate the various stages of cataract affliction; the provision of an improved method of providing an animal eye lens with sufficient hardness to simulate a cataract lens; the provision of an improved method of providing an animal lens with diminished transparency so as to simulate a cataractous lens; and the provision of an improved method of forming proteinaceous material into a simulated cataractous eye lens.

Still other objects and further scope of applicability of the present invention will become apparent from the detailed description to follow.

DETAILED DESCRIPTION

The present embodiment is directed to the end of providing simulated cataract lenses having varying degrees of hardness and reduced transparency. This is significant because cataract lenses vary in hardness depending on the different stages of the disease. Also, the transparency thereof is diminished so as to simulate the transparency of a cataract lens.

In this invention, proteinaceous material is selected as the base material for use in making simulated cataract lenses. In a preferred embodiment, the proteinaceous material selected, is in the form of animal lenses which possess physiological characteristics similar to a human eye. Thus, the animal lenses, when suitably hardened, will particularly lend themselves to simulated cataract surgery. In this embodiment, the animal lenses can, for example, be from pigs, rabbits, cows, etc. These lenses can include the intact lens capsules.

To harden preselected areas of the animal lens, which may include the lens capsules, the animal eye is suitably punctured, split or otherwise opened in the desired vicinity of the intended tissue to be hardened. The lens capsules are suitably punctured by appropriate tools, such as a knife or the like so as to allow the application of a treating solution to the intended tissue. In this manner, the solution can evenly mix and react with the selected portions of the eye tissue. Thus, as will be described hereafter, the treating solution effects increased hardness and diminishes tissue transparency.

Each animal lens, which is to be treated, is placed in a suitable holder so as to be immersed in the treating solution. The treating solution includes a protein hardening or fixative agent having a strength needed to effect the desired degree of hardness. Immersion occurs at a preselected temperature and for predetermined time periods so as to achieve the desired degree of hardness and diminished transparency. Lenses can also be injected internally by means of a syringe with the treating solution to effect hardening from within.

The present invention discloses the use of protein or body tissue hardening or fixative agents. These fixatives cross-link the protein tissue so as to preserve its structure with the least possible alteration thereof. Both organic and inorganic hardeners are contemplated for the formation of stable cross-links in the proteinaceous material. Organic hardeners, such as aldehyde hardeners can be used. In this preferred embodiment, the tissue fixative used is glutaraldehyde which is particularly useful in preserving sections of cells and tissues of animals. In addition, glutaraldehyde is a good anti-bacterial agent which serves to prevent possible destruction of the tissue. Examples of other hardening agents which can be used are as follows: osmium tetroxide, formaldehyde and acrylic aldehyde.

Of course, the hardening agent selected determines the concentration which should be used in the treating solution to achieve the desired hardening. Additionally, the hardening agent selected should, preferably, react with the lens tissue so as to effect a diminished transparency thereof to a degree which simulates the range of diminished transparency of cataract lenses.

It has been determined that the longer the immersion time the harder the lens. If the immersion time is too long, the lens will become unacceptably hard. If the immersion time is too short, the lens will be insufficiently hard to simulate a cataract lens. The time period selected should be such as to promote the degree of fixing or cross-linking reaction necessary to generally uniformly harden the tissue intended to be hardened. The hardening or immersion time varies based on the proteinaceous material being used, the temperature range, and the strength of hardening agent in the treating solution. Increased hardness, in general, is proportional to increased immersion time. Generally, the temperatures selected should fall into a range from about 4° C. to 50° C. The temperature range is selected because it provides convenience and allows fairly uniform penetration and diffusion of the hardening agent into the lenses. Temperatures outside this range can lead to tissue destruction by freezing or heat denaturation, and result in uneven hardening.

As noted, the preferred proteinaceous material for simulating the lens is an animal eye. These animal eyes can be selected from animals such as pigs, geese, cows, etc. For accessing the tissue to be treated, the lens is split or punctured through utilization of a knife, surgical blade, or other suitable instrument. In this embodiment, the animal lens capsule is split with a 3 mm knife and placed in the holder for purposes of immersion in a treating solution contained on a Petri dish or the like. For example, a porcine eye is selected and the lens with the intact capsules is removed. It should be noted that the lens capsules can be removed if desired. The reason for removing the capsule is for even more uniform treating of the lens. The punctured lens allows the hardening solution to intimately mix with the desired tissue.

The treating solution includes a balanced saline solution (BSS), such as the type commercially available from Alcon Surgical, Inc. of Ft. Worth, Tex. The balanced saline solution has a pH value of about 7.7, but the pH ranges can vary from about 7.0 to 7.8 for use with the hardening agent of this embodiment. If the pH value is outside the noted range, there is the possibility of affecting the reactivity of the crosslinking agent or causing lens tissue damage. The treating solution besides including the balanced saline solution, includes a concentration of 2.5% glutaraldehyde which material is commercially available. Other concentrations of the glutaraldehyde are contemplated, for example, ranging from 1% to 5% of the solution. Concentrations of glutaraldehyde outside this range would lead to poor penetration or inadequate hardening. Alternatively, application of the treating solution can be achieved through the use of a syringe.

The present concentration range quickly preserves or hardens the protein molecules forming the animal lens tissue. Glutaraldehyde is preferred because it diminishes the transparency of the porcine lens so as to simulate that found in human cataractous lenses. With glutaraldehyde the color of the lens becomes slightly yellow and the yellow color intensifies as the immersion duration increases. Other protein fixatives selected preferably should not only cause hardening, but also develop the degree of opacity desired to simulate that found in the human cataractous lens. Additionally, glutaraldehyde is a good anti-bacterial agent which serves to prevent possible destruction of the tissue.

In accordance with this invention, hardness for a given material increases independently as a function of increasing immersion time, increasing processing temperatures and increasing concentrations of the hardening agent. Stated differently, other variables being constant, the higher the temperature, the quicker the eye hardens; the higher the concentration of hardening agent, the quicker the eye hardens, and the longer the immersion time, the harder the lens becomes. The foregoing parameters can be varied to accommodate a great variety of needs. For instance, immersion times can vary from about two (2) minutes to twenty-four (24) hours or more; the treating temperatures can be in a range of from about 4° C. to 50° C., and the concentrations of the glutaraldehyde, for example, can vary from about 1% to 5%. Referring back to the immersion step, it can be conducted for time periods ranging from, for example, about two (2) minutes to twenty-four (24) hours or more with the preferred time durations being indicated in the Tables below.

Whatever combinations of temperature, time and concentration are selected, however, they should be for achieving uniform hardness and decreasing transparency. The more uniform the hardening, the more uniform the loss of transparency, and the harder the lens, the greater the opacity of the lens. Loss of transparency is also a function of the hardening agent, lens material and concentration of the hardening agent.

The Tables below illustrate that for a given temperature and concentration, that by increasing the immersion time, the hardness and the color changes are increased proportional to the increased immersion time.

It is pointed out that the softer the lens the earlier the stage of cataract affliction. Less hard cataract lenses are indicative of cataract diseased lenses at an earlier stage of the disease's development.

Table I indicates one example.

The materials used in the reduction to practice of a preferred embodiment are shown in Table I:
2.5% Glutaraldehyde in BSS (pH 7.4) (GSS);
BSS Solution (Balanced Saline Solution);
Porcine (pigs) eyes; holder; Petri dishes;
surgical blades; 1 cc syringes with 22 g needle, and a 3 mm knife.

TABLE I

| | (IN VITRO LENS FIXATION) | |
|---|---|---|
| LENS # | FIXATION TIME. MINS. | RESULT |
| 1 | 2 | slightly yellow. quite soft, increasing yellow color |
| 2 | 5 | " |
| 3 | 7 | " |
| 4 | 10 | " |
| 5 | 15 | " |
| 6 | 20 | " |
| 7 | 25 | " |
| 8 | 30 | " increasing hardness |
| 9 | 45 | " increasing hardness |
| 10 | 1 hr | " increasing hardness |
| 11 | 2 hrs. | " increasing hardness |
| 12 | 3 hrs. | " (medium/hard) |

The examples of Table I are performed at 4° C.

Examples have shown that an even greater fixation time (e.g. 4 or 5 hours), if performed at room temperature, would lead to lenses which are too hard for simulation purposes. From Table I, it will be noted that at reduced temperatures, such as 4° C., longer fixation times lead to good simulation results. Also, if for example, syringes were used to apply the hardening agent locally to the center of the lens, there was limited localized hardening in the center, but not the desired overall hardening effect. Thus, immersion is preferred. Following immersion for the noted times, the eyes are rinsed in a BSS solution.

Table I indicates a series of lenses tested, wherein each tested lends becomes increasingly opaque as the immersion time increases; since the degree of yellow darkens and the lens becomes brown in color. Thus, the loss of transparency of the lens increases proportionally to increased immersion time.

The following Table II gives results with different concentrations of glutaraldehyde solution and longer immersion times. The procedure used in like that used in Table I including the use of the same temperature.

TABLE II

| LENS # | [GSS] % | FIXATION TIME, HRS. | RESULT |
|---|---|---|---|
| 1 | 2.5 | 3 | Good, slightly hard softer center |
| 2 | 2.5 | 4.5 | Too hard |
| 3 | 2.5 | 6 | " |
| 4 | 2.5 | | " |
| 5 | 2.5 | | " |
| 6 | 2.5 | | " |
| 7 | 5.0 | | " |
| 8 | 5.0 | 3 | Good, slightly hard, soft center |
| 9 | 5.0 | 4.5 | Too hard |
| 10 | 5.0 | 6 | " |
| 11 | 5.0 | 60 | " |
| 12 | 5.0 | 120 | " |

It will be appreciated that this example is subject to the variables as discussed above with respect to time, temperature and concentration.

Although the above examples indicated that immersion times of four (4) to five (5) hours can lead to unacceptable results, the invention contemplates immersion times up to, for example, twenty-four (24) hours. However, to achieve the longer immersion times, for example, the temperature or concentration of fixative can be suitably decreased.

It will be appreciated that the foregoing procedures yield an economical and highly efficient approach for providing simulated cataractous lenses having varying degrees of hardness and loss of transparency with animal lenses so as to correspond to the various stages of a cataract lens disease.

Although the above embodiments disclose the procedure of natural lens material in conjunction with glutaraldehyde, it will be appreciated that other protein materials such as collagen and gelatin may be used in lieu of the animal lenses. Of course, the collagen and gelatin can be shaped into lenses having a transparency similar to animal eye lenses.

According to the present invention, it will be recognized that certain changes ma be made in the above described simulated lens and method of making the same without departing from the scope of the present invention herein involved. It is maintained that all matter contained in this description shall be interpreted as illustrative and not in a limiting sense.

What is claimed is:

1. A method of hardening a proteinaceous material so as to simulate a cataractous lens comprising the steps of:
    selecting an animal eye proteinaceous material in a form similar to a human eye lens;
    selectively opening preselected portions of the proteinaceous material;
    applying a treating solution including a protein hardening agent comprising an aldehyde fixative to at least the partially opened lens portions;
    subjecting the treated lens to a predetermined temperature for a selected time so that the treated lens portions achieve a predetermined hardness thereof.

2. The method of claim 1 wherein the animal eye tissue selected has the physiological characteristics similar to the human eye.

3. The method of claim 1 wherein the aldehyde fixative is glutaraldehyde.

4. The method of claim 3 wherein the concentration of glutaraldehyde is from about 1% to 5% of the solution.

5. The method of claim 4 wherein said preselected temperature is in a range of about 4° C. to 50° C.

6. The method of claim 5 wherein the treating solution includes a balanced saline solution having a pH range of about 7.0 to 7.8.

7. The method of claim 3 wherein the concentration of glutaraldehyde is from about 1% to 5% of the solution.

8. The method of claim 1 wherein the hardening agent selected also serves to diminish the transparency of the treated tissue.

9. The method of claim 1 wherein the degree of hardening increases as a function of increasing time.

10. The method of claim 1 wherein said introducing step is performed by immersion into a container housing the treating solution.

11. A simulated cataractous lens comprising an animal eye proteinaceous material having a human lens configuration and being selectively treated with a proteinaceous hardening agent comprising an aldehyde fixative so that the hardness of the treated lens material simulates the hardness of a cataract afflicted lens.

12. The simulated lens of claim 11 wherein said proteinaceous lens material is selected from a group of animal eyes including pigs, geese, rabbits and cows.

13. The simulated lens of claim 12 wherein the hardening agent reduces the transparency of the animal lens.

* * * * *

UNITED STATES PATENT AND TRADEMARK OFFICE
CERTIFICATE OF CORRECTION

PATENT NO. : 5,163,843

DATED : November 17, 1992

INVENTOR(S) : Sari L. Brenner

It is certified that error appears in the above-identified patent and that said Letters Patent is hereby corrected as shown below:

On the title page, item (54) and column 1, line 1, change "METHD" to --METHOD--.

Item (56): line 7, under "OTHER PUBLICATIONS" change "opthamology" to --Ophthalomogy--.

Col. 5, line 55, change "lends" to --lens--;
        line 62, change "in" to --is--.

Col. 6, line 44, change "ma be" to --may be--.

Col. 7, claim 7, line 1 thereof, change "3" to --4--;
        lines 1-3, change "concentration of glutaraldehyde is from about 1% to 5% of the solution" to --preselected time is in a range of from about 2 minutes to 24 hours.--

Signed and Sealed this

Thirtieth Day of November, 1993

Attest:

BRUCE LEHMAN

Attesting Officer

Commissioner of Patents and Trademarks